United States Patent Office 2,740,556
Patented Apr. 3, 1956

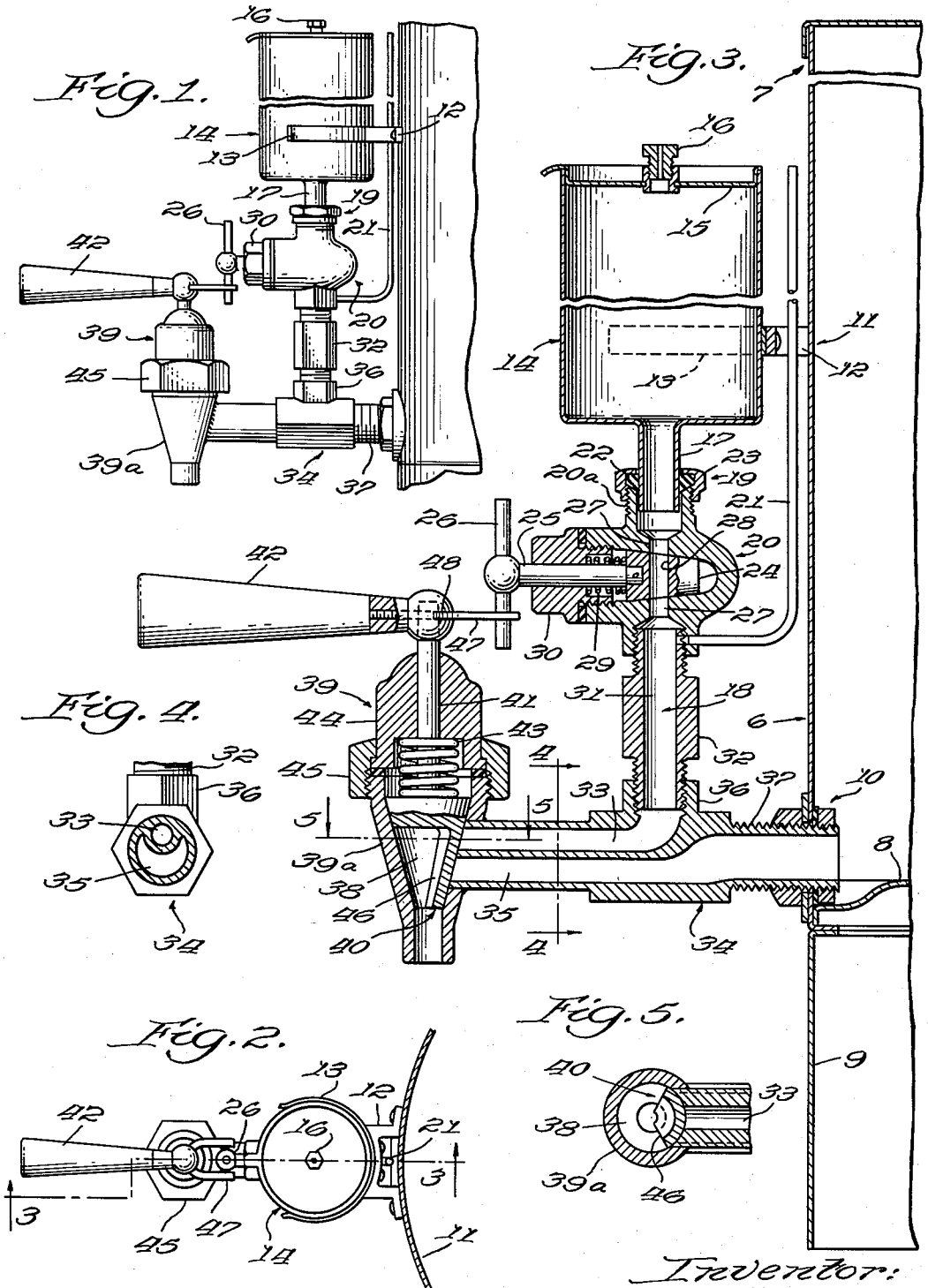
April 3, 1956  P. BARON  2,740,556
LIQUID METERING BLENDING AND DISPENSING VALVE
Filed Feb. 12, 1951
Inventor:
Paul Baron.

2,740,556

LIQUID METERING BLENDING AND DISPENSING VALVE

Paul Baron, Los Angeles, Calif.

Application February 12, 1951, Serial No. 210,589

8 Claims. (Cl. 222—133)

This invention relates to a dual valve assembly for simultaneously mixing together two different liquids and then dispensing them as a beverage.

More specifically, the present invention pertains to a device wherein two reservoirs containing different liquids to be blended together into a beverage to be dispensed and sold, are each provided with a fluid delivery means, and a flow control valve is provided for each of said fluid delivery means, the two valves being connected with each other in such a manner that the manual operation of one of them to dispense the beverage also operates the other valve, the latter valve being a metering valve which causes a metered amount of a sweetening or flavoring liquid to be injected into the quantity of liquid dispensed each time the device is operated.

An object of the invention is to provide a dependable, simplified mechanical connection between two valves, one controlling and metering the supply of an undiluted beverage ingredient and the other valve for controlling the admission of a diluting liquid into a blending chamber therewithin, so that, when the latter valve is manually operated the former valve will automatically function.

A more specific object is to provide an improved blending valve structure wherein a liquid blending valve chamber and associated dual liquid supply conduits cooperate in a superior manner.

Other objects, features and advantages of invention will hereinafter appear.

Referring to the accompanying drawing, wherein is shown a preferred embodiment of the invention, Fig. 1 is a side elevation of the device attached to a liquid supply container fragmentarily shown, portions of the device being broken away to contract the view.

Fig. 2 is a top plan view of the structure shown in Fig. 1.

Fig. 3 is an enlarged section taken on line 3—3 of Fig. 2, portions being broken away to contract the view and to disclose underlying structure.

Fig. 4 is a vertical section taken on line 4—4 of Fig. 3.

Fig. 5 is a horizontal section taken on line 5—5 of Fig. 3.

Referring in detail to the drawing the invention shown therein, for dispensing a drink which has been mixed in the device by commingling together two different liquid substances, as for example coffee syrup and hot water, is attached to a conventional water tank 6 which is shown vented at 7 and includes a bottom wall 8 having a depending skirt 9 therearound which is adapted to house a heating element (not shown).

The novel combination of parts of which the device is composed is attached at two different points to said tank 6, the major point of support 10 being located in line with the bottom 8 and the other point of support 11 being located in an upwardly spaced relation to said point of support 10, and may consist of a bracket 12 secured to the tank 6, to which bracket is fastened a C-shaped yoke 13, the free ends of which are adapted to yieldingly embrace a circular syrup container 14.

Said container 14 has a lid 15 provided with a vent plug 16 and from the bottom of the container 14 depends a spout 17 communicating with a syrup reservoir 18 through the medium of the liquid seal connection 19 and liquid control valve 20. Said reservoir 18 is shown provided with an L-shaped air inlet tube 21, the shorter limb of which is supported and liquid sealed within the lower tubular internal screwthreaded end of valve 20 and the long limb of which extends upwardly to a point substantially on a level with the top edge of the syrup container 14. Said long limb preferably is located within a space bounded by the back side of the bracket 12 and the limbs thereof which secure such bracket to said syrup container.

The aforesaid liquid seal connection 19 comprises a sealing gasket 22 held firmly against the inwardly chamfered mouth of the upper externally screwthreaded tubular extension 20a of the valve 20 by means of the liquid sealing nut 23 secured to said tubular extension. Said spout 17 extends through said nut 23 and thence into said tubular extension of the valve. Owing to the fact that the gasket 22 is resilient the container 14, upon expanding the arms of the yoke 13, may be manually elevated and detached for cleansing purposes when desired.

The aforesaid control valve 20 includes a valve element 24 having a stem 25 operable by the branched handle 26, said control valve having opposed and alined liquid conducting passages 27 extending thereinto, one of which is formed by the aforesaid upper externally screwthreaded tubular extension, which at times are placed in communication with said reservoir 18 when the passage 28 in the valve element 24 is operated to register with said passages 27. A spring 29 interposed between the screwed down cap 30 of the valve and the valve body 24 and surrounding the stem 25 maintains the passage 28 in axial alinement with the passages 27 when the handle 26 is operated to register such passage and passages.

The aforementioned syrup reservoir 18 includes a space 31 in a vertically disposed nipple 32 and a space 33 in a horizontally disposed two part liquid conducting conduit 34, space 33 being located in a superjacent relation to the liquid flow passage 35 extending through said conduit 34.

Nipple 32 has its opposite ends externally screwthreaded, the upper screwthreaded end being screwed into the lower tubular extension of the valve 20 and the lower screwthreaded end of the nipple being screwed into an internally screwthreaded boss 36 upstanding from said conduit 34.

The intake end 37 of the conduit 34, wherethrough is conducted one of the liquid substances forming the drink, is externally screwthreaded, and as mentioned before, when such end is screwed into the tank 6 in the conventional manner shown, such connection forms the major support for the drink mixing apparatus.

Liquids emerging from the conduit spaces 33 and 35 enter a commingling chamber 38 located in a second control valve 39, the flow of the liquids being regulated by the valve element 40 through the medium of the valve stem 41 connected thereto and manually operated by means of the handle 42. Valve element 40 is yieldably held on its seat by means of a spring 43 acting between the head 44 and said valve element 40, said spring being placed under compression when the head 44 is joined to the shell portion 39a of the valve by means of the clamping nut 45.

Valve element 40 has a truncated portion of its frustoconical part removed to provide for the chamber 38, a remaining minor segment 46 adapted to close and open the mouth ends of the conduit spaces 33 and 35 simultaneously upon actuation of the handle 42.

Due to the fact that the conical wall of the shell body 39a extends downwardly, passage 35 empties into the chamber 38 at a point farther out than does the liquid flowing into the chamber from passage 33, hence there is a turbulence set up in the chamber 38 where the two different liquids merge upon entering the chamber. This turbulence is enhanced by the upward flare of the chamber opposite the mouths entering thereinto. This turbulence further aids in the entraining of the entrapped coffee syrup in the reservoir spaces 31 and 33 due to a slight suction produced by the commingled drink flowing from the valve body 39.

It will be noted in Fig. 3 that the outlet end of the conduit body 34 extends into the shell casing 39a of the valve body 39, in which position it is permanently secured by a circumferential weld extending around said conduit body at its juncture with the shell casing 39a of said valve body 39.

When the handle 42 is actuated to open the valve part 46 so that hot water (in the case of coffee making) may flow through passage space 35 into the mixing chamber 38 and the predetermined entrapped coffee syrup (in the case of coffee making) is permitted simultaneously to pass from the reservoir 18 into commingling relation with the hot water, some provision must be made to close the control valve 20 upon the opening of valve 39 in order that a predetermined amount of coffee syrup may be assured which will flow from the reservoir into the mixing chamber in making one cup of coffee.

The mechanism which produces the latter result comprises a U-shaped member 47 which is rigidly secured in a kerf 48 cut in the handle 42, as shown in Fig. 3, the arms of the U embracing a branch of the handle 26 in a straddling fashion so that when the handle 42 is manually operated in a horizontal plane to open the valve element 46, an arm of the U contacts a branch of the handle 26 to rock it in a vertical plane to close the valve 20, thus opening and closing of the valves 39 and 20 are effected simultaneously.

Conversely, moving the handle 42 to close valve 46 simultaneously effects the opening of the valve 20 through contact of the other arm of the U against the opposite side of the branch of the handle being operated upon.

Owing to the presence of the air inlet tube 21 the air pressure above the body of liquid in the reservoir 18 is relieved so that when the valve 46 is opened the entire contents of said reservoir 18 will be discharged into the cup receiving the blended liquids.

I claim:

1. In a structure of the kind described, a metering reservoir in a communicating relation with a first supply reservoir to be supplied with liquid therefrom, an automatic valve positioned to open and close communication between said first supply reservoir and said metering reservoir, a second supply reservoir, a manually operable valve having in it a mixing chamber, two conduit means one affording communication between said metering reservoir and said mixing chamber in said manually operable valve and the other affording communication between said second supply reservoir and said mixing chamber, said valves having separate control members and mechanical linkage connecting said control members to each other so that each time said manually operable valve is opened and closed to dispense liquid from its aforesaid mixing chamber said automatic valve is opened and closed in the delivery of a filling quantity into said metering reservoir.

2. The subject matter of claim 1 and the mixing chamber of said manually operable valve being frusto-conical and downwardly tapered, and said metering chamber communicating therewith at a point superjacent to the point of communication of said second supply reservoir therewith.

3. In a structure of the kind described, a metering reservoir in a communicating relation with a first supply reservoir to be supplied with liquid therefrom, an automatic valve positioned to open and close communication between said first supply reservoir and said metering reservoir, a second supply reservoir, a manually operable valve comprising a valve casing having in it a frusto-conical downwardly tapering mixing chamber the axis of which extends vertically, a conduit means affording communication between said second supply reservoir and the lower part of said mixing chamber, said conduit means being horizontal where it enters said mixing chamber, a conduit means affording communication between said metering chamber and said mixing chamber, the latter conduit means, conducting the liquid into said mixing chamber in a horizontal stream that enters said mixing chamber in a superjacent closely, parallel relation to the stream of liquid entering said mixing chamber from said second supply reservoir, a partly cut-away and partly intact frusto-conical hollow valve element turnably fitted within said valve chamber with its said intact portion positioned simultaneously to open and simultaneously to close communication of both of said two conduit means with said mixing chamber so that, while the lower stream of liquid passes into said frusto-conical mixing chamber and is deflected upwardly by that wall of the chamber opposite the side through which it enters, a liquid stream from the aforesaid superjacent conduit means will be mixed thereinto in a turbulent fashion, and mechanical means operatively connecting said two valves so that each time said manually operable valve is opened and closed to dispense liquid from its aforesaid mixing chamber said automatic valve is opened and closed in the delivery of a filling quantity into said metering reservoir.

4. The subject matter of claim 3 and said conduit means comprising a horizontally extending conduit having an outlet end which communicates with said mixing chamber when the valve in the latter is open, the lower portion of said conduit containing a passage communicating with said second supply reservoir and the upper portion of said conduit containing a passage communicating with said metering chamber.

5. The subject matter of claim 3 and the intact part of said frusto-conical hollow valve element having a circumferential extent but slightly greater than that required to close the aforesaid two passages which conduct fluid into said mixing chamber within the manually operable valve.

6. In a valve controlled device for blending liquids supplied from two different sources, a manually operable valve having in it a mixing chamber into which liquid from one of said sources flows when said valve is open, an automatically operable valve, conduit means associated with the latter valve and controlling the supply of liquid from the other of said two sources to said mixing chamber for admission into said chamber when said manually operable valve is open, said two valves having turnable stems which extend in an adjacent, rightangular relation to each other, an operating handle attached to the stem of said manually operable valve, a part of said handle surrounding the stem of the valve, there being a kerf extending into said handle part which surrounds the valve stem, a bifurcated member a part of which is secured within said kerf, and an arm carried by the aforesaid stem of said automatically operable valve, said arm being embraced by said bifurcated member so that the operation of said manually operable valve causes said automatically operable valve to operate.

7. In a structure of the kind described, a metering reservoir in a communicating relation with a first supply reservoir to be supplied with liquid therefrom, an automatic valve positioned to open and close communication between said first supply reservoir and said metering reservoir, a second supply reservoir, a manually operable valve having in it a mixing chamber, two conduit means one affording communication between said metering reservoir and said mixing chamber in said manually operable valve and the other affording communication between said second supply reservoir and said mixing chamber, one of said valves having a turnable stem with a handle portion extending angularly therefrom, and the other of said valves having a turnable stem with a yoke extending angularly therefrom and operatively embracing said handle portion of the former valve, so that each time said manually operable valve is opened and closed to dispense liquid from its aforesaid mixing chamber said automatic valve is opened and closed in the delivery of a filling quantity into said metering reservoir.

8. In a structure of the kind described, a metering reservoir in a communicating relation with a first supply reservoir to be supplied with liquid therefrom, an automatic valve positioned to open and close communication between said first supply reservoir and said metering reservoir, a second supply reservoir, a manually operable valve having in it a mixing chamber, two conduit means one affording communication between said metering reservoir and said mixing chamber in said manually operable valve and the other affording communication between said second supply reservoir and said mixing chamber, said automatic valve having a turnable stem with a handle extending angularly therefrom, and said manually operable valve having a turnable stem with a yoke extending angularly therefrom and operatively embracing said handle portion of said automatic valve, so that each time said manually operable valve is opened and closed to dispense liquid from its aforesaid mixing chamber said automatic valve is opened and closed in the delivery of a filling quantity into said metering reservoir.

References Cited in the file of this patent
UNITED STATES PATENTS

| | | |
|---|---|---|
| 1,387,995 | Limpert | Aug. 16, 1921 |
| 1,602,722 | Sturdivant | Oct. 12, 1926 |
| 1,782,678 | Bronson et al. | Nov. 25, 1930 |
| 2,023,373 | Notar et al. | Dec. 3, 1935 |